(12) United States Patent
Marques et al.

(10) Patent No.: US 8,995,729 B2
(45) Date of Patent: Mar. 31, 2015

(54) ACCELERATED COMPARISON USING SCORES FROM COARSE AND FINE MATCHING PROCESSES

(75) Inventors: Joseph P. Marques, Leesburg, VA (US); Jeffrey Hoyt, Herndon, VA (US); Scott Bai, Arlington, VA (US)

(73) Assignee: The MITRE Corporation, McLean, VA (US)

(*) Notice: Subject to any disclaimer, the term of this patent is extended or adjusted under 35 U.S.C. 154(b) by 433 days.

(21) Appl. No.: 13/324,557

(22) Filed: Dec. 13, 2011

(65) Prior Publication Data

US 2013/0051630 A1    Feb. 28, 2013

Related U.S. Application Data

(60) Provisional application No. 61/529,096, filed on Aug. 30, 2011.

(51) Int. Cl.
*G06K 9/62*    (2006.01)
*G06K 9/68*    (2006.01)

(52) U.S. Cl.
CPC ................................... *G06K 9/6857* (2013.01)
USPC ......................................................... 382/124

(58) Field of Classification Search
None
See application file for complete search history.

(56) References Cited

U.S. PATENT DOCUMENTS 5,845,005 A * 12/1998 Setlak et al. .................. 382/124

* cited by examiner

*Primary Examiner* — Brian P Werner
(74) *Attorney, Agent, or Firm* — Sterne, Kessler, Goldstein & Fox P.L.L.C.

(57) ABSTRACT

Systems, methods and computer-readable media that facilitate matching biometric data to entries in a gallery of biometric data. According to embodiments, a method is provided to match a query comprising biometric data to zero or more of the entries in the gallery. According to this method, a match query is received. The entries in the gallery of biometric data can then be filtered using features of the biometric data to produce a subset of entries that excludes unlikely matches to the query biometric data. A set of candidate entries can be created from the subset of entries where the candidate entries are high probability matches to the query biometric data above a certain pre-determined threshold.

32 Claims, 11 Drawing Sheets

ACCELERATED COMPARISON USING SCORES FROM COARSE AND FINE MATCHING PROCESSES

CROSS REFERENCE TO RELATED APPLICATION

This application claims the benefit under 35 U.S.C. §119(e) of U.S. Provisional Patent Application No. 61/529,096, filed on Aug. 30, 2011, which is herein incorporated by reference in its entirety.

GOVERNMENT LICENSE RIGHTS

Certain portions of this invention were made with government support under Contract Nos. TIRNO-99-D-0005 and HSHQDC-09-D-00001 awarded by the U.S. Department of Homeland Security (DHS). The government has certain rights in portions of the invention.

BACKGROUND OF THE INVENTION

1. Field of the Invention

The invention relates to systems, methods, and computer readable media that can be used for producing likely matches to a biometric query item.

2. Related Art

People have a number of unique physical attributes. For instance, fingerprints, iris patterns, and faces are all, for the most part, unique to everyone. As a result of their uniqueness, these physical attributes have been used to identify individuals for a long time.

By way of example, fingerprints have been used to identify individuals since at least the $19^{th}$ century. Historically, identification of an individual would take the form of first classifying the individual's fingerprint according to a classification system (the Henry system has been quite popular for a number of years) and then matching, by hand, that fingerprint to one of a number of previously classified fingerprints. With proper classification, this system could greatly reduce the number of fingerprints to which an actual person would have to compare the target fingerprint, thereby saving time. Of course, fingerprint matching under this scheme was still difficult and time consuming.

As time progressed and technology improved, computer systems capable of performing fingerprint matching were developed. At a high level, most of these computer systems work by taking a digitized representation of the fingerprint (or frequently a set of all 10 fingerprints)—i.e., biometric data—and analyzing it according to various algorithms against a database of other fingerprints in order to identify an individual associated with that fingerprint.

With the increasing use of biometric data to identify individuals for various purposes (both governmental and non-governmental), the databases containing biometric data have become large. According to some estimates, national scale biometric databases in the United States contain over 250 million identities. In addition, there is a change in how databases are used. Where, in the past, databases were used mainly to verity identity and/or credentials, there is currently a desire to use databases to perform exhaustive identity searches, which can be much more taxing on the matching systems.

In view of the changing nature of the databases and of their use, the current systems are rapidly becoming insufficient in a number of ways. First, they are too slow. Second, they are overly centralized, which can result in incomplete information and in central failure points. Third, a number of current systems are not scalable or are only minimally so. Accordingly, there exists a need in the art for fast systems for matching biometric data that do not suffer from the same failings as the currently available systems.

BRIEF SUMMARY OF THE INVENTION

Embodiments of the invention include systems, methods and computer-readable media that facilitate matching biometric data to entries in a gallery of biometric data. According to embodiments of the invention, a method is provided to match a query comprising biometric data to zero or more of the entries in the gallery. According to this method, a match query is received. The entries in the gallery of biometric data can then be filtered using features of the biometric data to produce a subset of entries that excludes unlikely matches to the query biometric data. A set of candidate entries can be created from the subset of entries where the candidate entries are matches to the query biometric data above a certain predetermined threshold.

According to some embodiments of the invention, a computer system is provided. The computer system includes a processing unit, a filtering unit, and a matching unit. The processing unit is configured to receive a match query comprising query biometric data. The filtering unit is coupled to the processing unit and it is configured to filter entries in a gallery of biometric data to produce a subset of entries that excludes unlikely matches to the query biometric data. The matching unit is configured to exhaustively compare the set of candidate entries that are likely matches to the query biometric data according to a pre-determined threshold and make a final matchability decision.

According to embodiments of the invention, a computer readable medium is provided. The computer readable medium contains computer instructions that, when executed by a computer system, cause the system to be configured to receive a match query comprising query biometric data. The computer instructions cause the computer system to filter the entries in a gallery of biometric data to produce a subset of entries that excludes unlikely matches to the query biometric data. Additionally, the computer instructions that are stored on the computer readable medium cause the computer system to create a set of candidate entries. The set of candidate entries includes entries from the subset of entries that are likely matches to the query biometric data according to a pre-determined threshold.

According to embodiments of the invention, a method, computer system, or computer readable medium is provided where the gallery of biometric data comprises a plurality of sub-galleries, each of which includes a portion of the entries of the gallery. According to some embodiments each sub-gallery can include an entirely unique portion of the gallery of biometric data. The distribution of the entries in the gallery of biometric data can also be randomized amongst the plurality of sub-galleries. Filtering and matching using each of the sub-galleries can be configured to be run in parallel.

According to some embodiments of the present invention, the biometric data contained in the match query can include classification information. Additionally, the entries in the gallery of biometric data may have classification information associated with each of them and a confidence level associated with that classification. According to some embodiments of the invention, the subset of entries can be further filtered according to classification. According to some embodiments, this further filtering is selective in that it does not occur unless the confidence associated with a particular classification is above a certain level.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to a person skilled i the relevant art(s) based on the teachings contained herein.

BRIEF DESCRIPTION OF THE DRAWINGS/FIGURES

DETAILED DESCRIPTION OF THE INVENTION

The following detailed description of the present invention refers to the accompanying drawings that illustrate exemplary embodiments consistent with this invention. Other embodiments are possible, and modifications can be made to the embodiments within the spirit and scope of the invention. Therefore, the detailed description is not meant to limit the invention. Rather, the scope of the invention is defined by the appended claims.

As noted previously, the present invention is largely concerned with finding a match, or set of likely matches, to a target biometric query (or "probe") in a gallery of biometric data. While the following describes the invention in terms of biometric data associated with fingerprints, iris patterns, and facial data, it is not so limited. Instead, the invention is broadly applicable to any kind of data or application for which matching is relevant.

Figure 1:
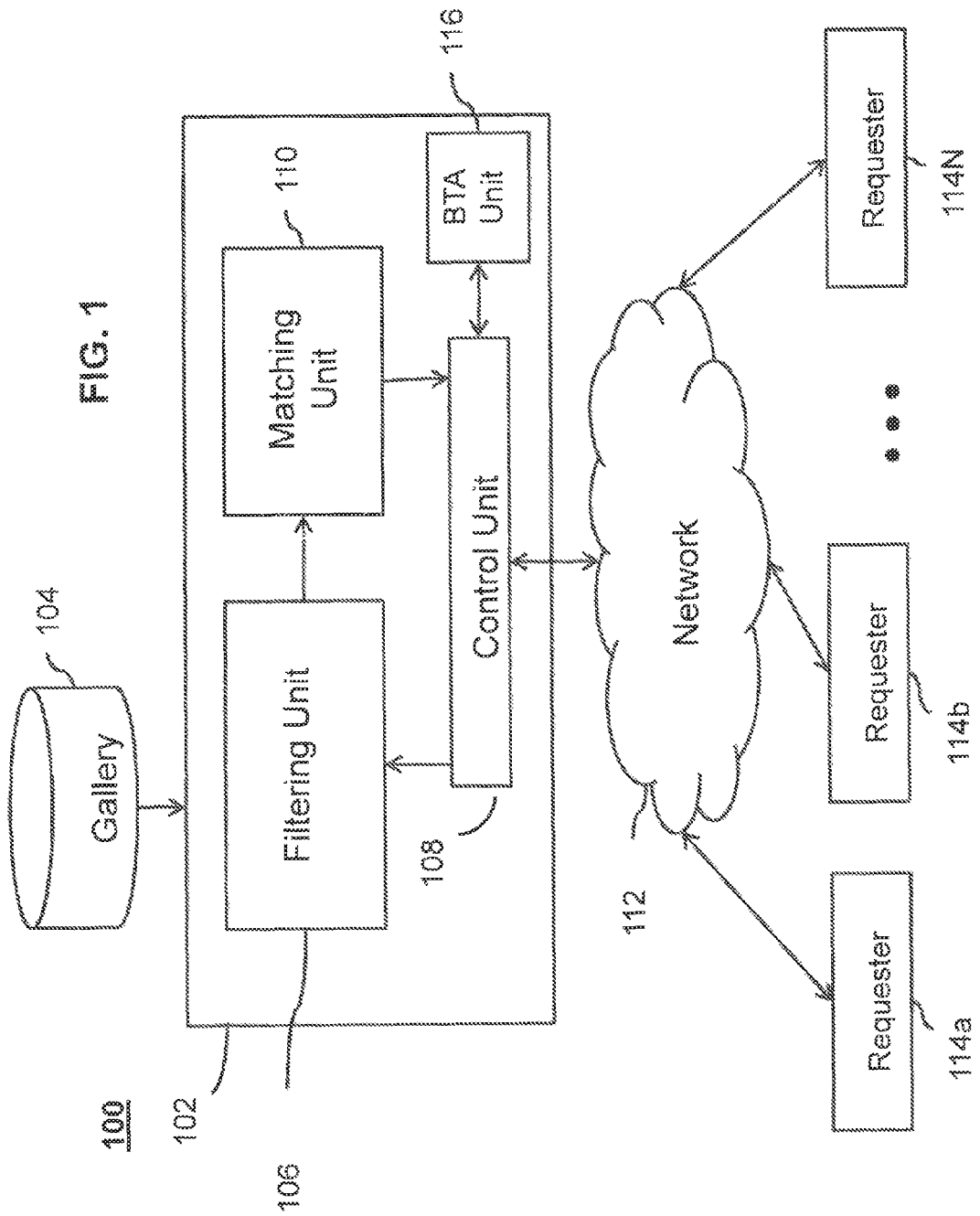
FIG. 1 is a functional block diagram of a biometric matching system according to embodiments of the invention.

FIG. 1 depicts a matching system 100 according to embodiments of the present invention. The matching system includes a match services provider 102, a gallery of biometric data 104, and a number of requesters 114a, 114b, and 114N (generically identified with the reference number 114) which can request a match be performed by the match services provider 102 via a network connection 112. According to some embodiments, the requesters 114 may also be directly connected to the match services provider 102. The match services provider 102 includes a filtering unit 106, a matching unit 110, and a control unit 108. While FIG. 1 depicts the gallery 104 as separate from the match services provider 102, according to some embodiments of the present invention, the gallery of biometric data 104 may form part of the match services provider 102. According to some embodiments, the matching services provider 102 also includes a biometric transaction analysis unit 116.

According to embodiments of the invention, the gallery 104 contains biometric data relating to a number of individuals. Preferably, the biometric data stored in the gallery has already been analyzed and the useful information extracted. For instance, each entry in the gallery could be mapped to a particular individual and contain coded information for use in filtering, a classification (e.g., a Henry classification if the data is fingerprint data) and a confidence in that classification, and minutiae or other relevant data used for matching. According to some embodiments of the invention the gallery 104 comprises a centralized database; however, according to other embodiments, the gallery 104 comprises a network of distributed databases.

The filtering unit 106 is responsible for filtering the entries in gallery 104 in order to eliminate unlikely matches to a probe. While, in general, filtering can be fairly inexact, it is also comparably fast and requires less computing power than fine matching. Accordingly, by filtering the gallery prior to matching, a significant time savings or reduction in hardware cost can result. At a high level, the filtering unit receives a match query or probe and creates a subset of the gallery 104 that excludes unlikely matches. According to some embodiments, the subset of the gallery 104 is defined such that it only contains entries whose likelihood of matching the search query is above a certain pre-determined threshold.

Figure 2:
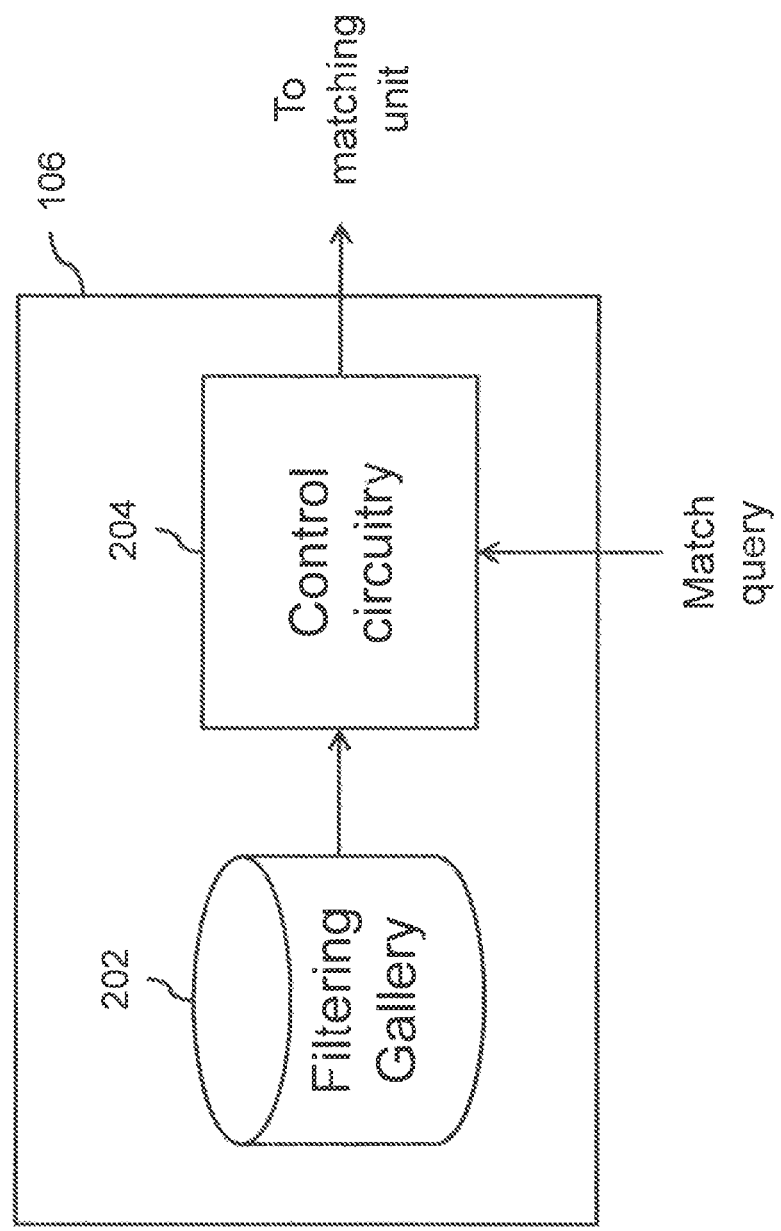
FIG. 2 is a functional block diagram of a biometric filtering unit according to embodiments of the invention.

FIG. 2 is a functional block diagram of a filtering unit according to embodiments of the present invention. As shown in FIG. 2, the filtering unit 106 can include control circuitry 204 and a specialized filtering gallery 202. According to embodiments of the invention prior to filtering, the filtering gallery 202 is pre-loaded with a subset of information about each entry in the gallery of biometric data 104. Preferably, the filtering gallery 202 contains only the subset of information from the gallery 104 that is relevant to the filtering technique being employed by the filtering unit 106. This concept is best explained by way of a specific example.

Consider the case where the biometric data comprises fingerprint data. One common way of taking fingerprints is in the form of simultaneous plain impressions, or "slaps." A slap is a simultaneous impression of one or more of a person's fingerprints, often from a single hand only. These slaps can be represented in a number of different ways. For instance, they can be stored as simple image files. However, image files are unwieldy and cumbersome to use and contain very little readily useful information about the fingerprints. In order to be used in a matching system, the images have to be analyzed and information put in a useful format for the matching system. An example of a useful format would be files that can contain vector information, minutiae information, classification information, or some combination thereof. Particularly useful for filtering is the FingerCode discussed in A. K. Jain, S. Prabhakar, L. Hong, and S. Pankanti, "FingerCode: A Filterbank for Fingerprint Representation and Matching,"

Proc. Of IEEE Computer Society Conf. on Computer vision and Pattern Recognition, June 23-25, Fort Collins, Co. 1999, although the invention is not limited to this example.

Continuing with the discussion of the example, a matching query or probe can comprise the information slap information discussed above. So could each of the entries in gallery 104. That is, each of the entries in the gallery and the biometric data associated with the match query can contain, for instance, minutiae, vector information, a classification (e.g., Henry classification), and the FingerCode described by A. K. Jain. In such a scenario, because the only information relevant to filtering is the FingerCode, the filtering gallery 202 only needs to be pre-loaded with the FingerCode data associated with each entry in the gallery 104.

Referring back to FIG. 1, upon receipt of a match query, the filtering unit 106 performs a filtering process. The result of the filtering process is a subset of entries from the gallery 104 that contains entries that are likely matches above a certain threshold; unlikely matches to the match query are eliminated from the subset. The entries contained in this subset can then be passed to the matching unit 110.

The control unit 108 is configured to perform various control functions for the match services provider 102 and may comprise one or more CPUs. For instance, the control unit may handle input/output functions with the requesters and communicate with the network 112. Additionally, the control unit, according to embodiments of the invention, may control the process flow of the various components of the match services provider 102.

The matching unit 110 is configured to receive a subset of gallery entries from the filtering unit 106. According to embodiments of the present invention, the matching unit 110 performs a fine matching algorithm on each of the entries in the subset in order to determine whether they match the probe. Based on the matching algorithm, the matching unit determines an identity score for each of the entries it analyzes. An identity score is a numerical representation of the likelihood that the entry is a match to the target of the match query. Entries with identity scores above a certain pre-determined threshold are deemed "hits" and are returned or added to a list of candidate entries. According to some embodiments the list of candidate entries contains a finite number of the most likely matches. For instance, the list could be defined such that it can only contain 20 entries. In this case, once the list is full, new entries are added only if their identity score exceeds that of the entry with the lowest identity score on the candidate list—i.e., if they are deemed more likely matches. The entry with the lowest identity score or that is otherwise deemed the least likely match can be removed from the list at that point.

According to some embodiments, the match services provider 102 may also include a biometric transaction analysis (BTA) unit 116. The BTA unit 116 can be necessary when the biometric data contained in the match query from the requester 114 is not in a useful format for the match services provider 102. For instance, consider the case where a match query contains simple slap imagery for a match target. As discussed above, slap images cannot be used by themselves to perform the filtering and matching functions performed by the filtering unit 106 and the matching unit 110. Accordingly, the BTA unit 116 is required to convert the biometric data contained in the match request into a usable form. For instance, in the slap image case, the BTA unit 116 could analyze the image and produce a Henry classification, detect minutiae qualities, detect core and delta values, create minutiae triangulation and edges, create edge lookup tables for minutiae, normalize the fingerprint, create an appropriate FingerCode, and create a Henry-based index. All of this information could be included in an identity template to be used for subsequent filtering and matching. According to some embodiments, the BTA unit 116 comprises part of the control unit 108.

Figure 3:
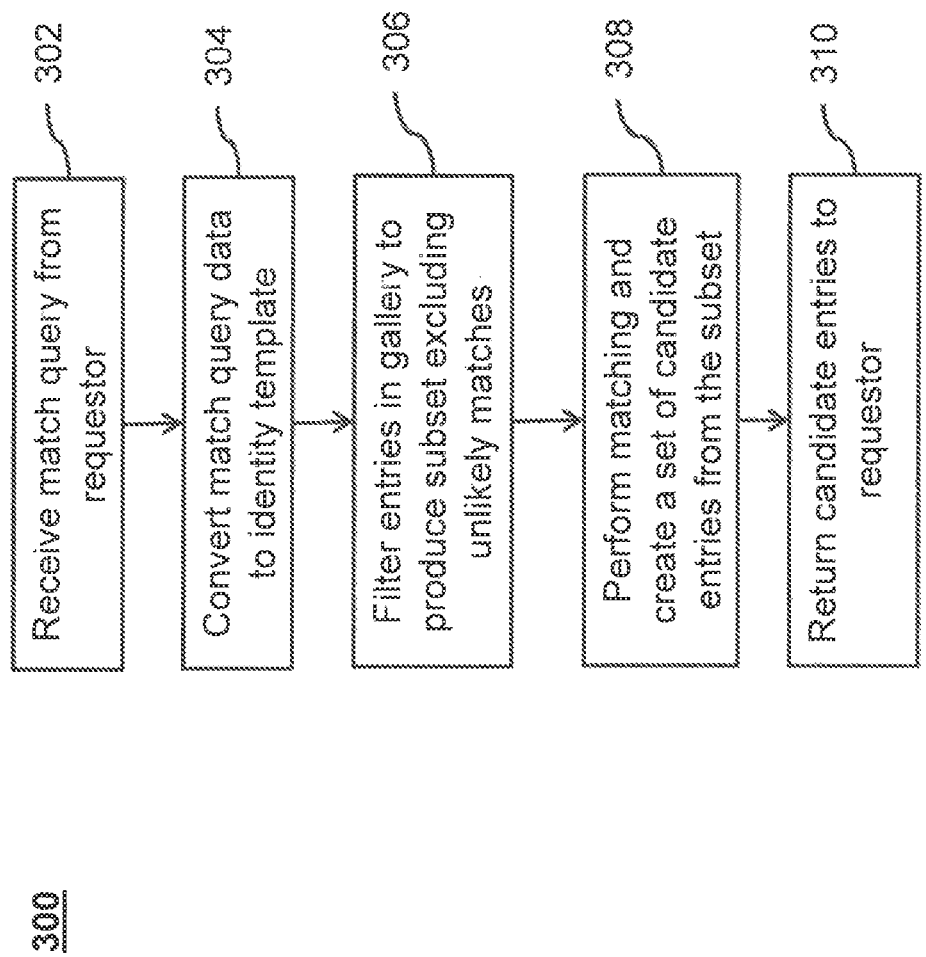
FIG. 3 is a logical flow chart depicting a method of matching a query to one or more entries in a gallery of biometric data according to embodiments of the invention.

FIG. 3 depicts a method 300 of matching a target query to one or more entries in a gallery of biometric data according to embodiments of the present invention. According to the method, a match query is received by the match services provider 102 from a requester 114 at step 302. The match query, at its basic level, should contain some form of biometric information (e.g., fingerprints, iris patterns, facial information, etc.). The match query may be sent using network 112 or through any other suitable means of communication between the requester 114 and the match services provider 102.

As noted above, the match query, if received in the improper form, may need to be converted into a useable form. Accordingly, at step 304, the biometric data contained in the match query data is converted to an identity template. According to some embodiments of the invention, step 304 can be omitted because the match query already contains the biometric data in usable form. This step may be performed by the control unit 108 or by a dedicated biometric transaction analysis unit 116.

At step 306, the filtering unit 106 filters the entries in the gallery to produce a subset of entries that excludes unlikely matches to the match query. According to embodiments of the present invention, the filtering unit 106 may filter the gallery according to a "coarse" filtering method, which may comprise multiple stages. Such a method is described in more detail below.

After the filtering step 306, the filtered subset can then be passed to the matching unit, which creates a set of candidate entries from the subset of entries at step 308. The set of candidate entries, according to embodiments of the invention, comprises a set of entries from the gallery of biometric data 104 that are highly probable matches against the query compared to other entries in the gallery of biometric data 104. The candidate entries can then be returned to the requester as a result of the search at step 310.

Figure 4:
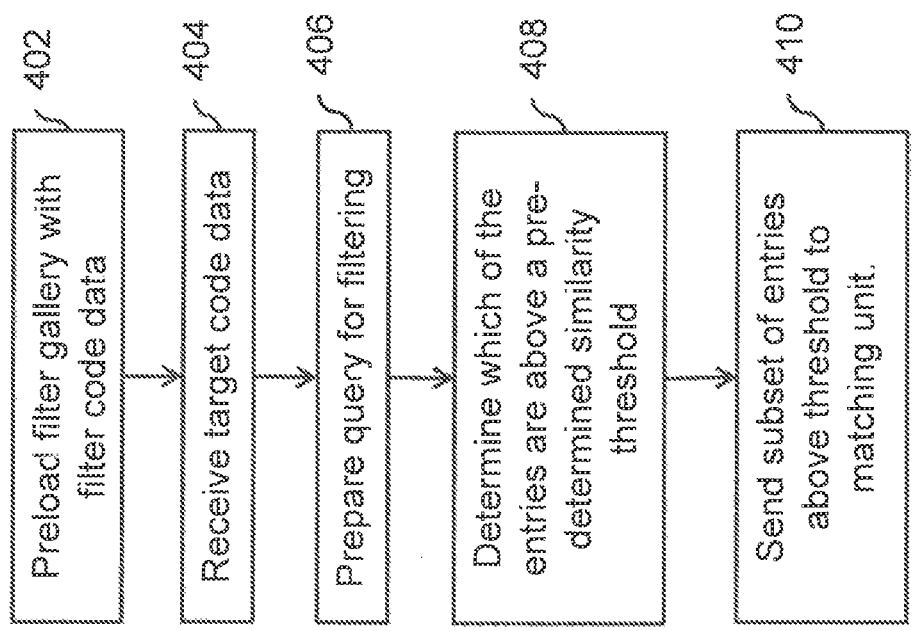
FIG. 4 is a logical flow chart depicting a method of matching a query to one or more entries in a generic processing unit (GPU) based filter gallery of biometric data according to embodiments of the invention.

FIG. 4 is a flowchart depicting method 400 of filtering the gallery of biometric data 104 prior to performing the matching step 308. This method could be used, for instance, to perform the filtering step 306 of method 300, which is depicted in FIG. 3.

According to the method 400, the filter gallery 202 is first preloaded with the appropriate data for the filtering technique being used at step 402. For instance, if the biometric data relates to fingerprints, the gallery could be pre-loaded with FingerCodes, according to various embodiments of the invention. At step 404, the filtering unit 106 receives the data concerning the target of the search query or "probe." According to embodiments of the present invention, the filtering unit 106 only receives data concerning the target of the search query that is relevant to perform filtering. For instance, the filtering unit 106 might only receive Finger Code data if that is the data being used to filter the entries in the gallery 104. At step 406, the query data is prepared for the filtering process, if necessary.

Again, step 406 is best explained with reference to a specific example. Consider, again, the case where FingerCodes are used for the filtering step. The filtering process begins by preparing the incoming search queries for submission. The FingerCodes for all ten fingers are separated from the main body of the search query and pre-rotated through several orientations. For instance, they could be rotated through 7 vertical orientations, each separated by 22.5 degrees. It has been found that such a scheme accommodates virtually all variations seen in the orientation of the slap image during capture. The result is a search query that comprises 70 FingerCodes (i.e., 7 rotations of each of the 10 fingers). Since each FingerCode is 512 bytes in size, the target code is approximately 35 KB.

After the target code is prepared for filtering, the filtering can begin at step 408. This occurs by quickly comparing the pre-rotated target codes against all the identities in the gallery, choosing the best matching rotation, and returning a set of match scores for each in the gallery. The match scores indicate how each finger in the target code compared to each finger of the identities stored in the gallery. According to some embodiments, the best score for the 7 pre-rotations is the only one retained, since this indicates the most likely (i.e., the proper) orientation needed for that fingerprint.

The match scores that fall below a certain likelihood can be filtered out according to embodiments of the invention as shown in step 408. The entries above the threshold form a subset of entries to be submitted to matching unit 110. At step 410, the subset of entries is sent to the matching unit. In some embodiments, the subset of entries may reflect a fixed percentage of the gallery ordered by the most likely entries. This fixed percentage can be quite small (e.g., less than 10%) according to some embodiments of the invention.

Figure 5:
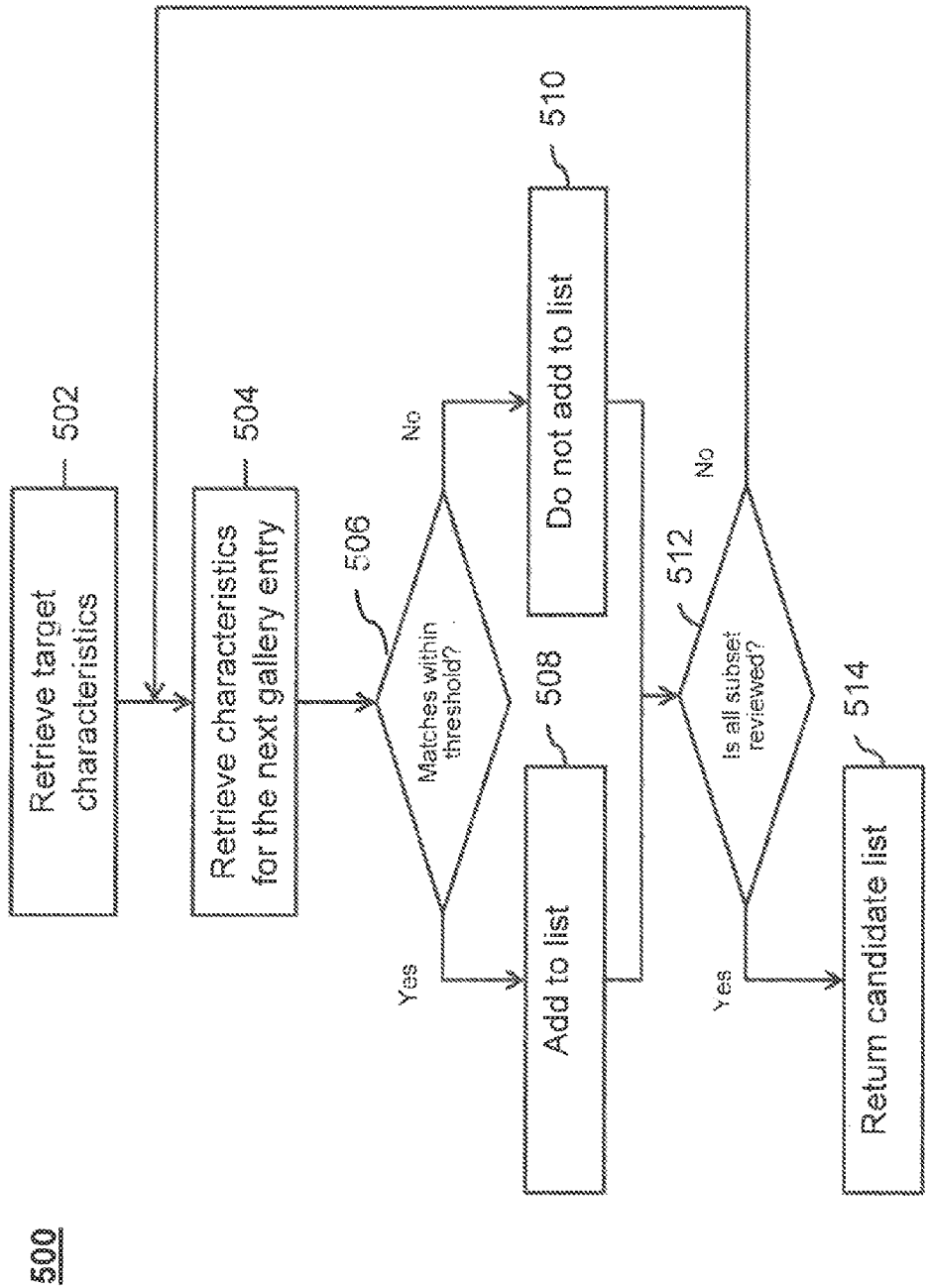
FIG. 5 is a logical flow chart depicting a method of selective filtering according to embodiments of the invention.

FIG. 5 depicts a method 500 for matching a target matching query to entries in a gallery of biometric data 104 according to embodiments of the present invention. This method could be used, for instance, to perform step 308 of method 300 depicted in FIG. 3. According to the method 500, the characteristics of the target of the match query or probe are retrieved at step 502. Next, the appropriate characteristics of the next gallery entry in the subset are retrieved at step 504. At step 506, the matching unit 110 determines an identity score of the current entry with respect to the target of the match query. If the identity score is above a certain threshold, then the current gallery entry under analysis can be added to a list of candidate matches at step 508. If the current gallery entry under analysis does not have an identity score above a certain threshold, then it is not added to the candidate list at step 510. At 512, the method loops back to step 504 if there are still remaining entries in the subset. If not, then the list of candidate results is returned at step 514.

Figure 6:
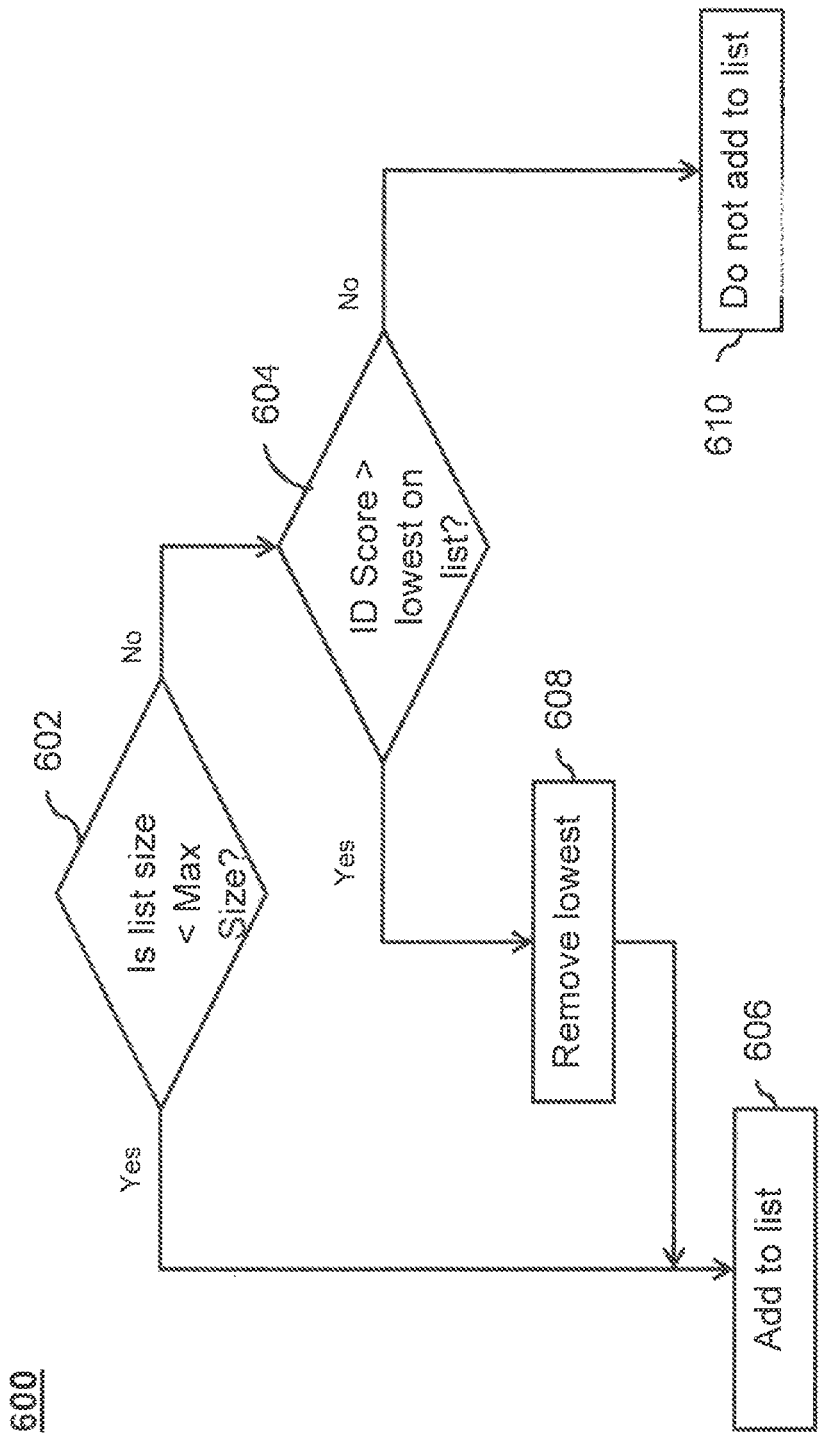
FIG. 6 is a logical flow chart depicting a method of populating a candidate list according to embodiments of the invention.

According to some embodiments of the present invention, the candidate list produced by the matching unit 110 is limited in size. For instance, the candidate list could be limited to only 20 identities. This helps to ensure that the resulting candidate list is useful to the requester 114. Under such a scenario, method 600 in FIG. 6 can be used to perform the step of adding an entry to the candidate list 508. As shown in FIG. 6, it can first be determined whether the list size is at its maximum at step 602. If the list size is less than the maximum, then the entry is added to the candidate list at step 606. If, however, the candidate list has reached its maximum size, then the method determines whether the entry to be added has a better (e.g., higher) identification score than at least the entry with the lowest score on the list at step 604. If the entry to be added does not have a higher score than the lowest score already on the candidate list, then the entry to be added is not added to the list at step 610. However, if the entry to be added has a higher score than the lowest scoring entry on the list, then the lowest scored entry is removed at step 608 and the entry to be added is added to the list at step 606.

Figure 7:
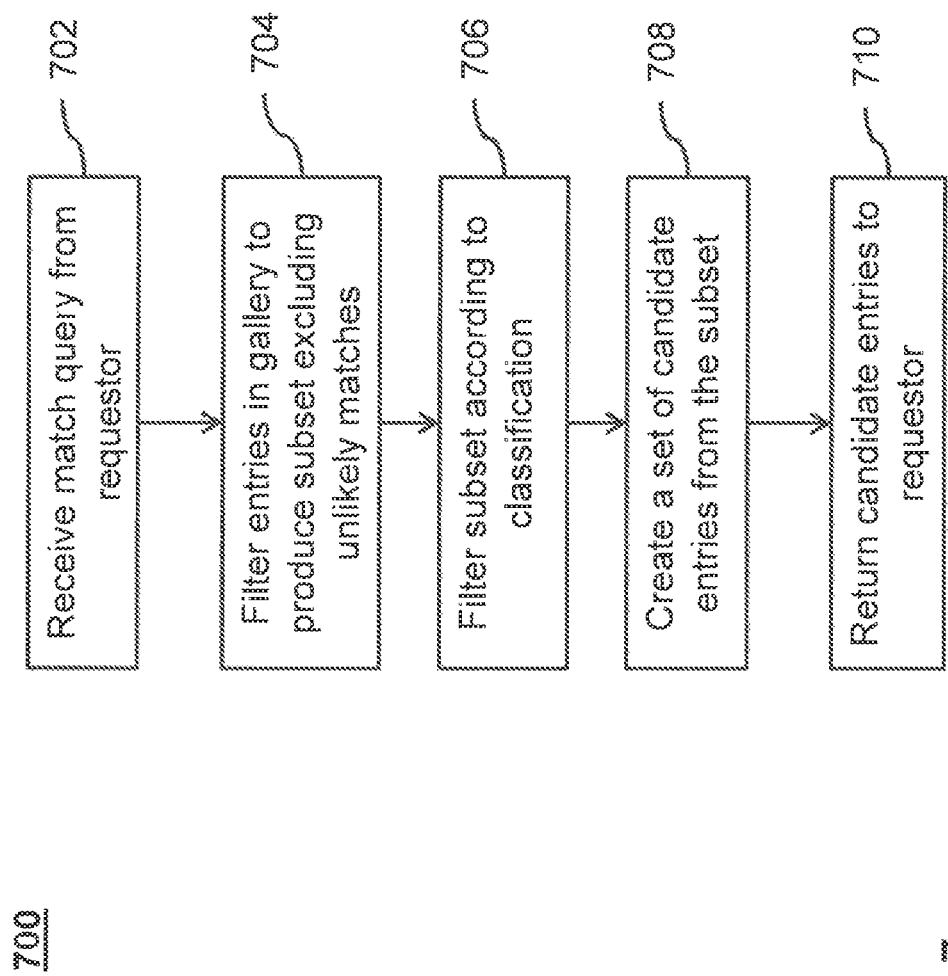
FIG. 7 is a logical flow chart depicting a method of matching a query to one or more entries in a gallery of biometric data according to embodiments of the invention.

FIG. 7 depicts a method 700 for matching a target matching query to entries in a gallery of biometric data 104 according to embodiments of the present invention. Method 700 is similar to method 300 depicted in FIG. 3, but it has a second filtering step, which further reduces the computer resources required to perform the final matching step.

According to method 700, at step 702, the match services provider 102 can receive a match query request from a requestor 114. Using attributes of the match query, the filtering unit 106 can then filter the entries in the gallery to produce a subset of entries that excludes unlikely matches to the target of the match query at step 704. At step 706, a second filtering step can be performed. The second filtering step can filter the subset of entries according to a classification system (e.g., the Henry classification system) and filter out additional unlikely matches. According to embodiments of the invention, the second filtering may only occur if the confidence in the classification of the entry is above a certain level. At step 708, the twice-filtered subset is used by the matching unit 110 to create a set of candidate entries. These candidate entries can be returned to the appropriate requester at step 710. According to some embodiments, any number of cascaded filtration stages similar to 706 may be employed as long as they provide distinctive insights on the likelihood of matchability.

Figure 8:
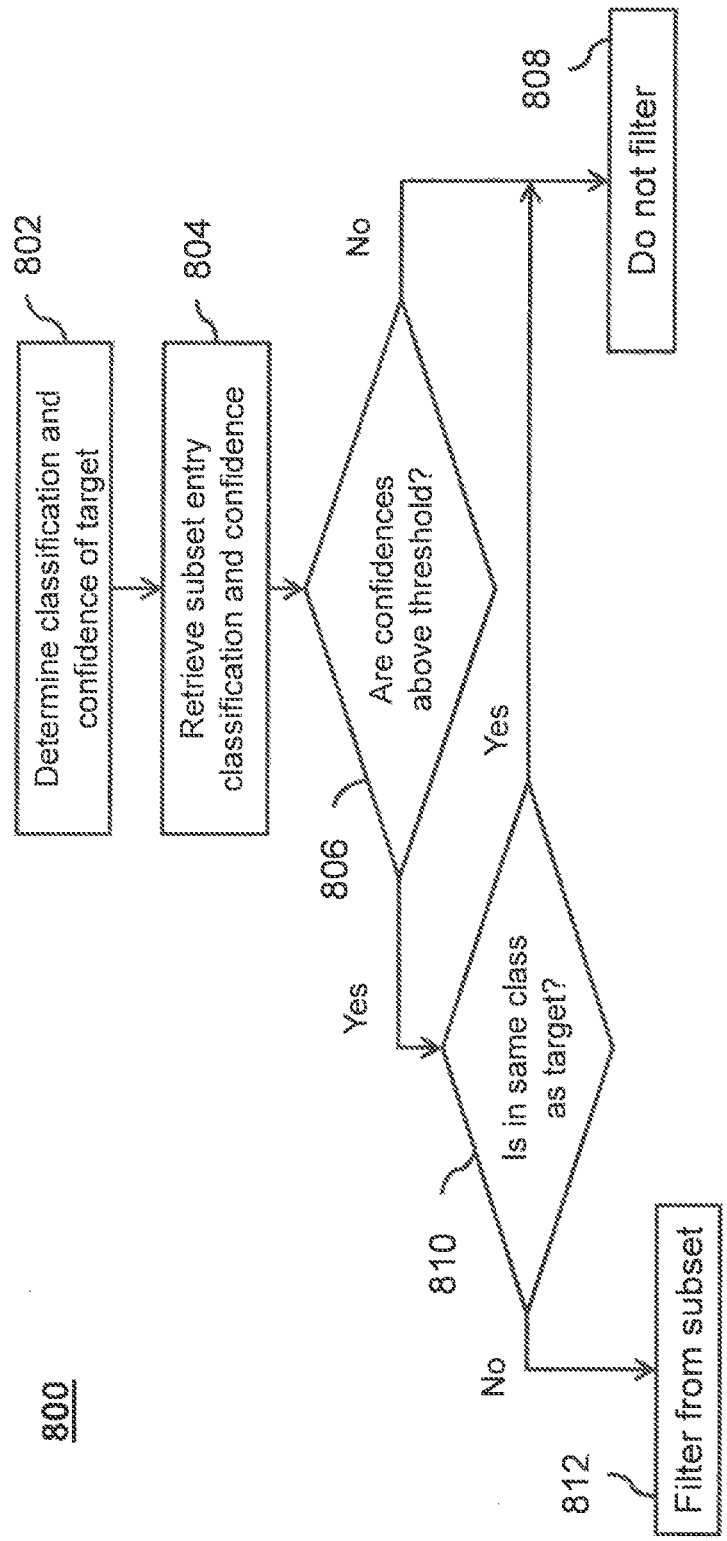
FIG. 8 is a logical flow chart depicting a method of performing a secondary filtering according to embodiments of the invention.

FIG. 8 depicts a method 800 for selectively filtering the subset of candidate entries according to the classification of the target of the match query. For instance, method 800 could be used to perform step 706 of method 700 depicted in FIG. 7. At step 802, the classification of the target of the match query is determined. Then, for each entry in the subset, the classification and a confidence in that classification is retrieved at step 804. If it is determined that the confidence in the classification is not above a certain level, at step 806, then the entry is not filtered from the subset at step 808. However, if step 806 determines that the confidence is above a certain level, then the method determines whether the subset entry is in the same class as the target of the match query at step 810. If it is determined that the entry is in the same class as the target of the match query, then the entry is not filtered form the subset at step 808. If, however, at step 810 it is determined that the subset entry is not in the same class as the target of the match query, then it is filtered from the subset at step 812. This entire process 800 is repeated for each entry in the subset according to embodiments of the invention. Additionally, according to embodiments of the invention, steps 806 and 810 can be reversed; the class can be determined before the confidence and vice versa.

Figure 9:
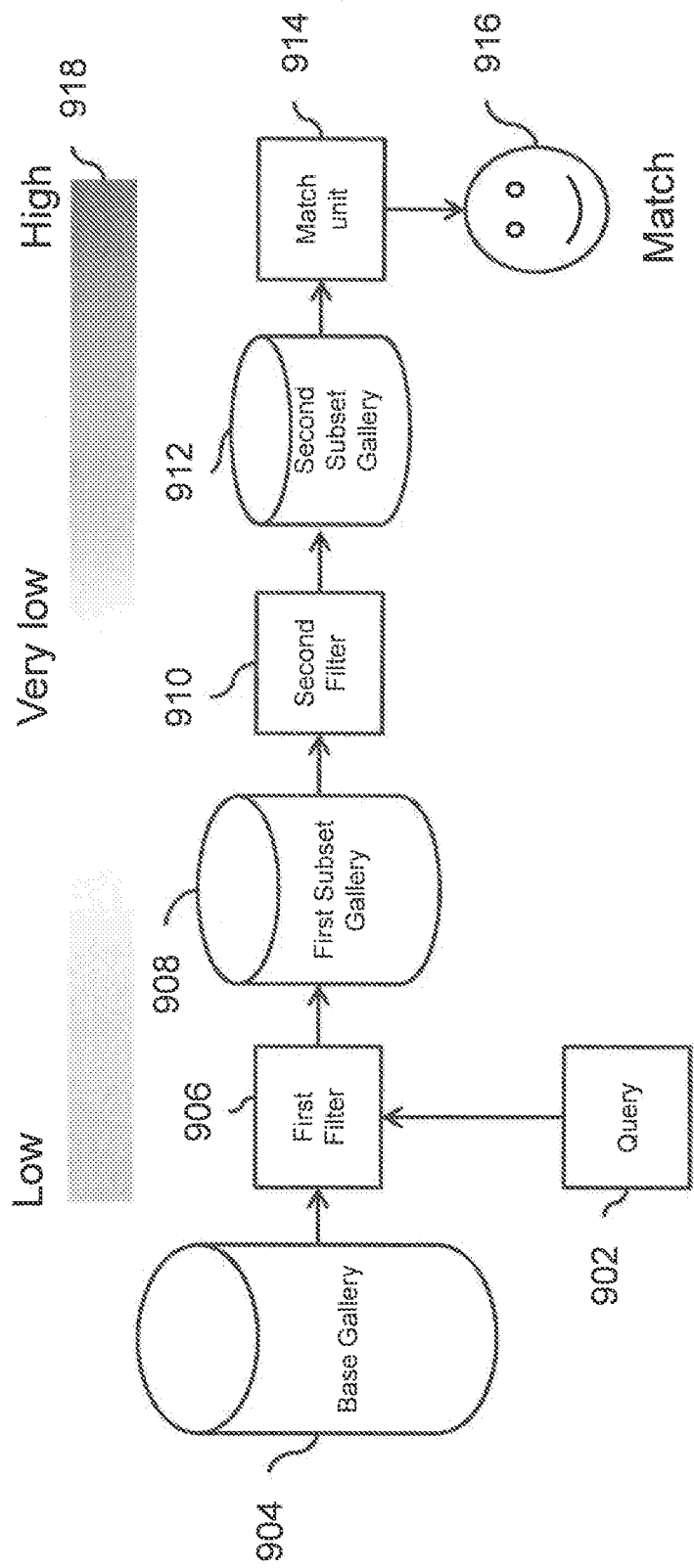
FIG. 9 depicts the logical process flow of matching methods according to embodiments of the present invention.

FIG. 9 depicts a process flow and the relative computation cost for each step in processing a match query according to embodiments of the present invention. As depicted in FIG. 9, a query 902 is made and input to a first filter 906. Based on characteristics of the match query 902, the first filter filters the base gallery of biometric data 904, which results in a first subset gallery 908. First subset gallery 908 can then be filtered by the second filter 910 to produce a second subset gallery 912. The second subset gallery 912 can then be used by the match unit to match the target of the match query to an entry or entries in the second subset gallery 912.

Figure 10:
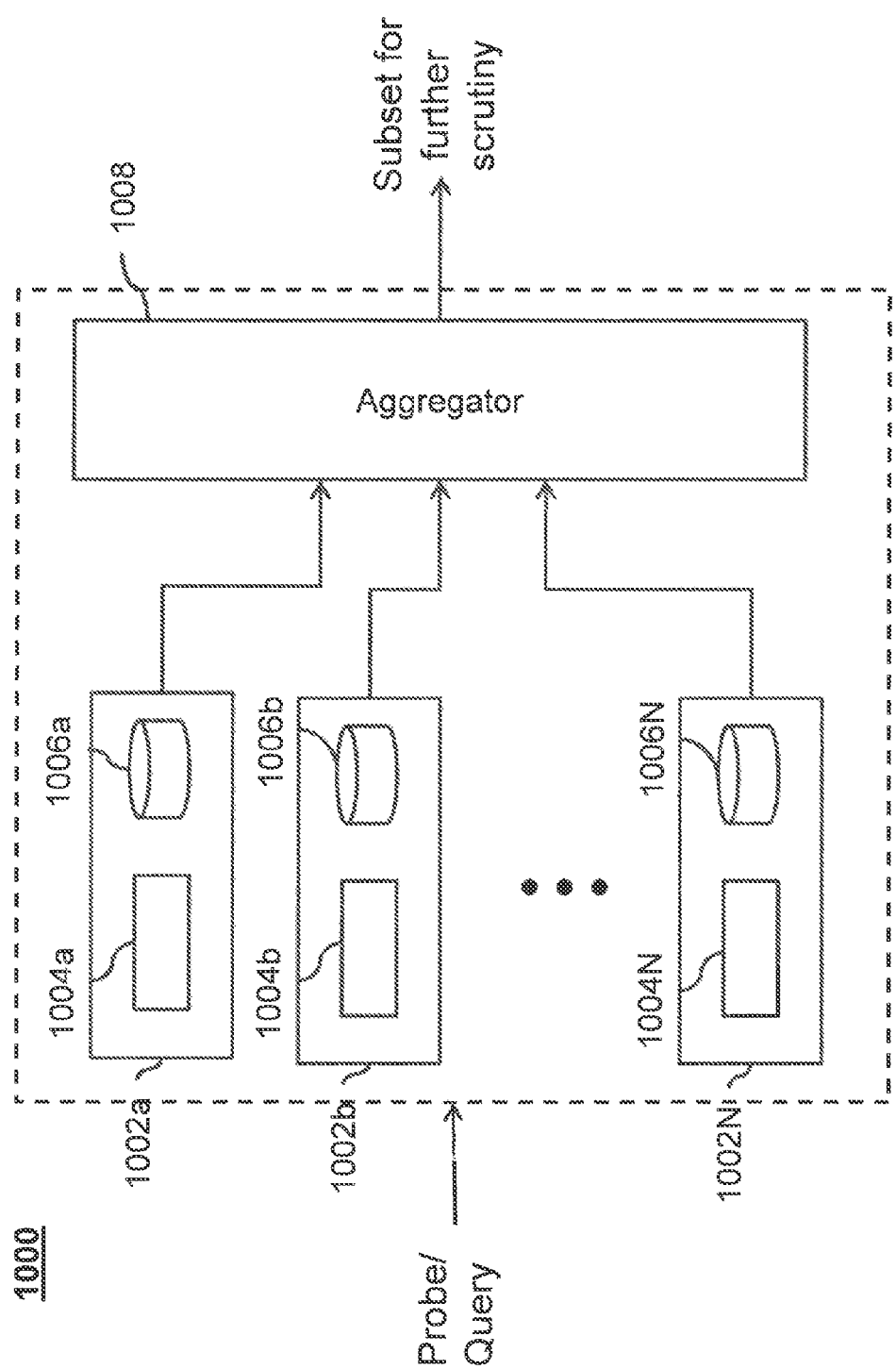
FIG. 10 is a functional block diagram depicting a biometric filtering unit according to embodiments of the present invention.

According to some embodiments of the present invention, the filtering unit comprises a number of filtering sub-units that perform portions of the filtering in parallel. This is depicted in FIG. 10. As shown in FIG. 10, the filtering unit 1000 comprises a plurality of sub-units 1002*a,* 1002*b,* and 1002N (generically referred to using reference number 1002). Each of the units comprises a controller 1004 and a filtering sub-gallery 1006. The filtering unit 1000 receives a probe or matching query, which is then distributed to each of the sub-units 1002 so that they can perform the filtering operation on the portion of the gallery entries they are responsible for. The aggregator 1008 receives the resulting filtered results from each of the filtering sub-units 1002 and aggregates them into a subset to be sent for further scrutiny.

According to embodiments of the invention, the controllers 1004 comprise graphical processing units (GPUs), such as the Tesla line of GPUs offered by NVIDIA. These GPUs are fast and relatively inexpensive and can be made to operate in parallel, which enables faster filtering.

The filtering sub-units 1002 are designed to identify, from a given portion of the gallery, a short list of identities (i.e., entries from the gallery of biometric data 104) that have the highest probability of matching a specified target query identity. Stated differently, the sub-units 1002 exclude or filter the least likely matches. Remaining identities can then be supplied to later parts of the matcher unit or subsystem 110 for further processing. This filtering step (or "coarse match") can be computed by a dedicated software kernel ("coarse match kernel"), which is a small program that executes on the GPU.

The operation of the GPU-based filtering sub-units 1004 can best be described within the context of filtering using the FingerCode described above. According to embodiments of the invention, when a GPU is used as the controller 1004, each GPU's memory is preloaded with a contiguous array of FingerCode templates, where a "template," in this context, simply consists of a set of ten contiguous FingerCode vectors. These FingerCode vectors can be mapped to the corresponding entries or identities in the full gallery of biometric data 104.

According to some embodiments of the invention, each of the sub-galleries 1006 is loaded with a randomized portion of the gallery of biometric data 104. The distribution of gallery entries amongst the sub-galleries can also be optimized so that various statistical characteristics are evenly distributed amongst the sub-galleries 1006. For instance, each of the sub-galleries could be loaded with entries so that they have similar processing times, image quality levels, and biometric feature richness.

According to some embodiments each of the sub-galleries 1006 can be replicated multiple times to provide robustness and redundancy. To do this, the sub-galleries 1006 associated with multiple sub-units 1002 could be loaded with the same portion of the gallery of biometric data 104. In this case, the filtering would proceed as normal, however, the aggregator 1008 would have to eliminate duplicate entries from the subset of entries to be sent for further scrutiny.

The size of the sub-gallery 1006 that can theoretically fit on a given GPU device is bounded by the available global memory on that device. Global memory refers to a memory space accessible by any of the large number of processors on the GPU chip, hence the term "global". This logical address space can be assumed to correspond to the physical RAM attached to the GPU board. However, it should be noted that the amount of addressable global memory is always somewhat less than the physical memory listed in the device specifications because some memory space is required to store the actual machine code for the software running on the device (in this case the coarse matcher kernel), as well as other overhead associated with executing said software. For this reason, the real maximum sub-gallery size per GPU can only be determined after the software has been loaded onto the sub-unit 1004.

NVIDIA Tesla S1070 GPU subsystems have been found to perform well for the coarse matching portion of the match process, although the invention is not limited to this example. Each S1070 is a 1U rack containing four GPU boards, and communicates with the host computer using external peripheral component interconnect express (PCIe) cables and a host interface card installed into a PCIe slot. Each GPU board has 4 GB of RAM, meaning that slightly less than 4 GB is available for use by the GPU software as global memory. For fingerprint matching, each FingerCode vector is 512 bytes, and there are ten vectors (one per finger) per identity. Theoretically, the FingerCode templates of up to 838,860 identities can fit on each GPU in the Tesla S1070. In reality, because of the overheads mentioned above, approximately 800,000 can be allocated.

In order to perform the filtering, the code data for the target query (or "probe") is loaded in its entirety into registers at the beginning of the coarse match kernel. Each thread on the GPU is responsible for comparing a small portion of the probe FingerCode vectors against the corresponding portion of each identity from the gallery. Each comparison between the probe and a set of FingerCodes from the gallery requires that the gallery FingerCodes be loaded from global memory (GPU RAM) into registers, while the probe remains resident in the registers throughout. Global memory is accessed heavily, and every allocated byte will eventually be accessed during the match process as the kernel threads proceed through the gallery.

To hide the latency (amounting to hundreds of clock cycles) of global memory accesses, a large number of threads are used, with each group or "block" of threads being responsible for matching one finger at a time. Blocks responsible for FingerCodes that are ready to be processed can be executed by the GPU while other blocks wait for their FingerCodes to load from global memory. Nonetheless, global memory speed is still a factor in performance, and GPUs with faster RAM will (all else being equal) demonstrate better coarse match performance.

The majority of the execution time of the coarse match kernel is spent computing the match score for each pair of FingerCode vectors, which consists of computing a Euclidean distance between the two vectors. The slowest part of this computation is the parallel sum. Each iteration of the parallel sum algorithm adds a pair of elements per thread and stores its intermediate results in shared memory, halving the number of elements stored until a single element (the square of the coarse match score) remains. Performance of this stage depends on the bandwidth of the registers and the shared memory of the GPU.

Figure 11:
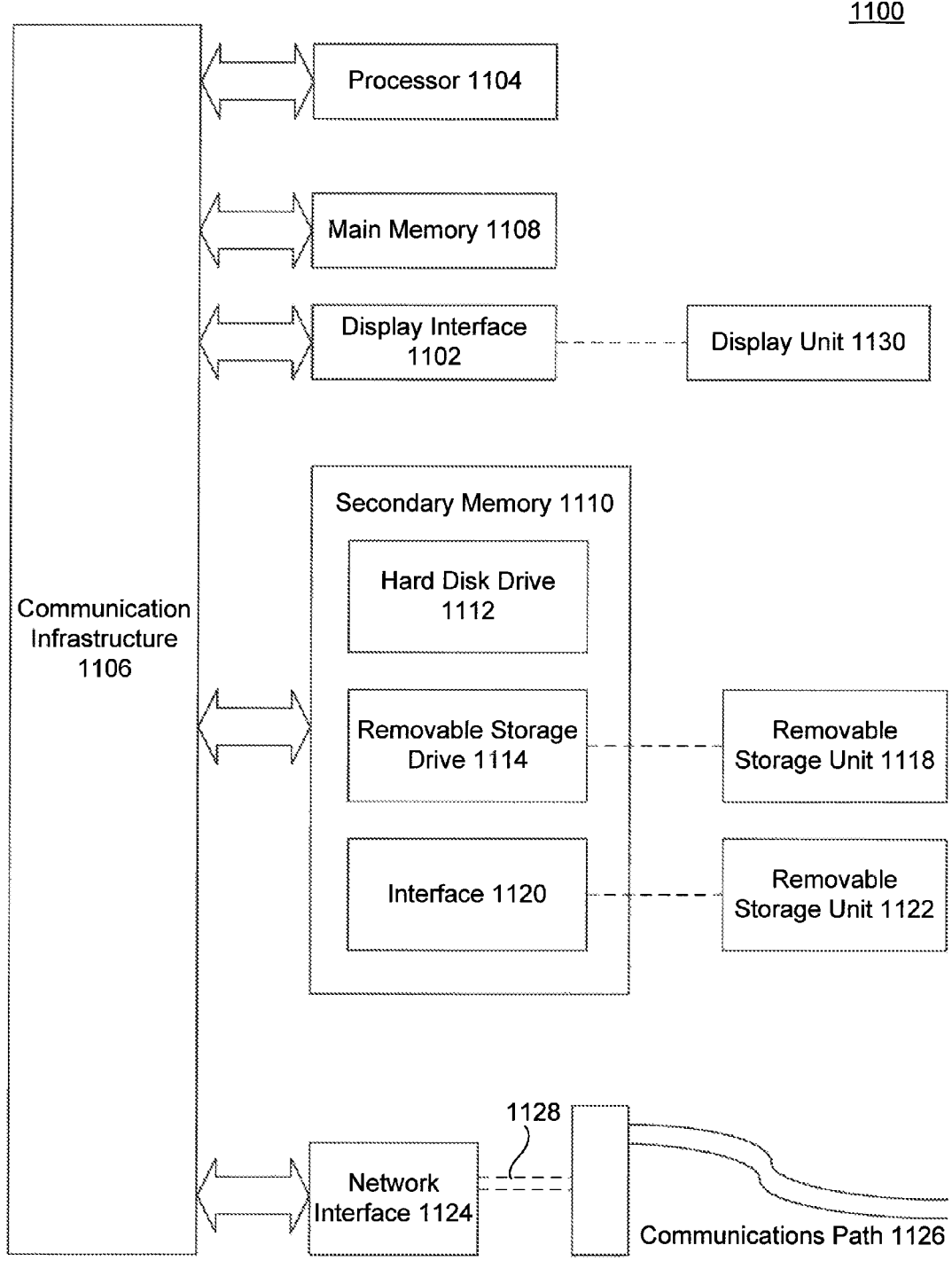
FIG. 11 depicts an example computer system in which embodiments of the present invention may be implemented.

Various aspects of the present invention can be implemented by software, firmware, hardware, or a combination thereof. FIG. 11 illustrates an example computer system 1200 in which the present invention, or portions thereof, can be implemented as computer-readable code. For example, the methods 300, 400, 500, 600, 700, and 800 illustrated by the flowcharts of FIGS. 3, 4, 5, 6, 7, and 8, can be implemented in system 1100. Various embodiments of the invention are described in terms of this example computer system 1100. After reading this description, it will become apparent to a person skilled in the relevant art how to implement the invention using other computer systems and/or computer architectures.

Computer system 1100 includes one or more processors, such as processor 1104. Processor 1104 can be a special purpose or a general purpose processor. Processor 1104 is connected to a communication infrastructure 1106 (for example, a bus or network).

Computer system 1100 also includes a main memory 1108, preferably random access memory (RAM), and may also include a secondary memory 1110. Secondary memory 1110 may include, for example, a hard disk drive 1112, a removable storage drive 1114, and/or a memory stick. Removable storage drive 1114 may comprise a floppy disk drive, a magnetic tape drive, an optical disk drive, a flash memory, or the like.

The removable storage drive 1114 reads from and/or writes to a removable storage unit 1118 in a well known manner. Removable storage unit 1118 may comprise a floppy disk, magnetic tape, optical disk, etc. that is read by and written to by removable storage drive 1114. As will be appreciated by persons skilled in the relevant art(s), removable storage unit 1118 includes a computer usable storage medium having stored therein computer software and/or data.

In alternative implementations, secondary memory 1110 may include other similar means for allowing computer programs or other instructions to be loaded into computer system 1100. Such means may include, for example, a removable storage unit 1122 and an interface 1120. Examples of such means may include a program cartridge and cartridge interface (such as that found in video game devices), a removable memory chip (such as an EPROM, or PROM) and associated socket, and other removable storage units 1122 and interfaces 1120 that allow software and data to be transferred from the removable storage unit 1122 to computer system 1100.

Computer system 1100 may also include a communications interface 1124. Communications interface 1124 allows software and data to be transferred between computer system 1100 and external devices. Communications interface 1124 may include a modem, a network interface (such as an Ethernet card), a communications port, a PCMCIA slot and card, or the like. Software and data transferred via communications interface 1124 are in the form of signals that may be electronic, electromagnetic, optical, or other signals capable of being received by communications interface 1124. These signals are provided to communications interface 1124 via a communications path 1126. Communications path 1126 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 1118, removable storage unit 1122, and a hard disk installed in hard disk drive 1112. Signals carried over communications path 1126 can also embody the logic described herein. Computer program medium and computer usable medium can also refer to memories, such as main memory 1108 and secondary memory 1110, which can be memory semiconductors (e.g. DRAMs, etc.). These computer program products are means for providing software to computer system 1100.

Computer programs (also called computer control logic) are stored in main memory 1108 and/or secondary memory 1110. Computer programs may also be received via communications interface 1124. Such computer programs, when executed, enable computer system 1100 to implement the present invention as discussed herein. In particular, the computer programs, when executed, enable processor 1104 to implement the processes of the present invention, such as the steps in the methods 300, 400, 500, 600, 700, and 800 illustrated by the flowcharts of FIGS. 3, 4, 5, 6, 7, and 8, discussed above. Accordingly, such computer programs represent controllers of the computer system 1100. Where the invention is implemented using software, the software may be stored in a computer program product and loaded into computer system 1100 using removable storage drive 1114, interface 1120, hard drive 1112 or communications interface 1124.

The invention is also directed to computer program products comprising software stored on any computer useable medium. Such software, when executed in one or more data processing device, causes a data processing device(s) to operate as described herein. Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method of matching biometric data to entries in a gallery of biometric data, comprising:
   receiving a match query comprising query biometric data;
   generating a target code from the query biometric data contained in the match query;
   filtering the entries in the gallery of biometric data by comparing the entries to the target code in order to produce a subset of entries that excludes unlikely matches to the query biometric data;
   filtering the entries in the subset of entries to produce a second subset of entries; and
   creating a set of candidate entries, from the second subset of entries, wherein the set of candidate entries comprises entries in the gallery of biometric data that are likely matches to the query biometric data according to a predetermined threshold.

2. The method according to claim 1, wherein the gallery of biometric data comprises a plurality of sub-galleries, each of which includes a portion of the entries of the gallery.

3. The method according to claim 2, wherein each portion of the entire gallery is unique.

4. The method according to claim 2, wherein distribution of entries in the sub-galleries is randomized such that the sub-galleries provide similar statistical characteristics with regard to at least one of a processing time, an image quality, and a biometric feature richness.

5. The method according to claim 2, wherein the entries in the gallery of biometric data are evenly distributed amongst the sub-galleries.

6. The method according to claim 2, wherein the filtering comprises filtering each of the sub-galleries in parallel.

7. The method according to claim 1, wherein each of the entries in the gallery of biometric data has a classification associated with it and a confidence associated with that classification.

8. The method according to claim 7, further comprising:
filtering the subset of entries according to their classification.

9. The method according to claim 8, wherein the filtering of the subset of entries according to their classification is performed selectively according to whether the confidence associated with the classification of a particular entry reaches a pre-determined confidence level.

10. The method according to claim 1, wherein the biometric data comprises at least one of fingerprint data, iris data, and facial recognition data.

11. A computer system comprising:
a processing unit configured to receive a match query comprising query biometric data;
a filtering unit coupled to the processing unit and configured to:
generate a target code from the query biometric data contained in the match query;
filter entries in a gallery of biometric data by comparing the entries to the target code in order to produce a subset of entries that excludes unlikely matches to the query biometric data; and
filter entries in the subset of entries to produce a second subset of entries; and
a matching unit configured to create a set of candidate entries from the second subset of entries, wherein the set of candidate entries comprises entries in the gallery of biometric data that are likely matches to the query biometric data according to a pre-determined threshold,
wherein the processing unit, the filtering unit, and the matching unit are implemented using one or more computer processors.

12. The computer system according to claim 11, wherein the filtering unit comprises a plurality of sub-filtering units, each of which includes a sub-gallery that includes a portion of the entries contained in the gallery of biometric data;
wherein the sub-filtering units are implemented using one or more computer processors.

13. The computer system according to claim 12, wherein the portion of the entire gallery contained in each sub-gallery is unique to that sub-gallery.

14. The computer system according to claim 12, wherein distribution of entries from the gallery of biometric data in the sub-galleries is randomized such that the sub-galleries provide similar statistical characteristics with regard to at least one of a processing time, an image quality, and a biometric feature richness.

15. The computer system according to claim 12, wherein the entries in the gallery of biometric data are evenly distributed amongst the sub-galleries.

16. The computer system according to claim 12, wherein each of the sub-filtering units further comprises a sub-processing unit and is capable of filtering the entries in its sub-gallery in parallel with the other sub-filtering units;
wherein the sub-processing unit is implanted using one or more computer processors.

17. The computer system according to claim 11, wherein each of the entries in the gallery of biometric data has a classification associated with it and a confidence associated with that classification.

18. The computer system according to claim 17, further comprising a secondary filtering unit coupled to said filtering unit and configured to filtering the subset of entries produced by the filtering unit according to their classification;
wherein the secondary filtering unit is implanted using one or more computer processors.

19. The computer system according to claim 18, wherein the secondary filtering unit is configured to filter the subset of entries selectively according to whether the confidence associated the classification of a particular entry reaches a pre-determined confidence level.

20. The computer system according to claim 11, wherein the biometric data comprises at least one of fingerprint data, iris data, and facial recognition data.

21. A non-transitory computer readable medium storing program instructions, which, when executed by a processor, cause the processor to perform the steps of:
receiving a match query comprising query biometric data;
generating a target code from the query biometric data contained in the match query;
filtering the entries in a gallery of biometric data by comparing the entries to the target code in order to produce a subset of entries that excludes unlikely matches to the query biometric data;
filtering the entries in the subset of entries to produce a second subset of entries; and
creating a set of candidate entries, from the second subset of entries, wherein the set of candidate entries comprises entries in the gallery of biometric data that are likely matches to the query biometric data according to a pre-determined threshold.

22. The computer readable medium according to claim 21, wherein the gallery of biometric data comprises a plurality of sub-galleries, each of which includes a portion of the entries of the gallery.

23. The computer readable medium according to claim 22, wherein each portion of the entire gallery is unique.

24. The computer readable medium according to claim 22, herein distribution of entries in the sub-galleries is randomized such that the sub-galleries provide similar statistical characteristics with regard to a processing time, an image quality, and a biometric feature richness.

25. The computer readable medium according to claim 22, wherein the entries in the gallery of biometric data are evenly distributed amongst the sub-galleries.

26. The computer readable medium according to claim 22, wherein the filtering comprises filtering each of the sub-galleries in parallel.

27. The computer readable medium according to claim 21, wherein each of the entries in the gallery of biometric data has a classification associated with it and a confidence associated with that classification.

28. The computer readable medium according to claim 27, the steps further comprising:
filtering the subset of entries according to their classification.

29. The computer readable medium according to claim 28, wherein the filtering of the subset of entries according to their classification is performed selectively according to whether the confidence associated with the classification of a particular entry reaches a pre-determined confidence level.

30. The computer readable medium according to claim 21, wherein the biometric data comprises at least one of fingerprint data, iris data, and facial recognition data.

31. The method according to claim 1, further comprising:
returning the set of candidate entries to a requester.

32. The method according to claim 1, wherein creating the set of candidate entries comprises:
   comparing an entry from the subset of entries to the match query to generate an identity score for the entry;
   determining that the identity score for the entry is above the pre-determined threshold; and
adding the entry to the set of candidate entries.

* * * * *

UNITED STATES PATENT AND TRADEMARK OFFICE
CERTIFICATE OF CORRECTION

| | | |
|---|---|---|
| PATENT NO. | : 8,995,729 B2 | Page 1 of 1 |
| APPLICATION NO. | : 13/324557 | |
| DATED | : March 31, 2015 | |
| INVENTOR(S) | : Marques et al. | |

It is certified that error appears in the above-identified patent and that said Letters Patent is hereby corrected as shown below:

In the claims,
Column 14, Line 45
Please replace "herein distribution of entries" with --wherein distribution of entries--.

Signed and Sealed this
Twenty-first Day of July, 2015

Michelle K. Lee
*Director of the United States Patent and Trademark Office*